United States Patent

Euskirchen et al.

[11] Patent Number: 5,826,826
[45] Date of Patent: Oct. 27, 1998

[54] LANDING PROCESS FOR PAYLOADS FROM AEROSPACE MISSIONS

[75] Inventors: Jürgen Euskirchen, Waidhofen; Jürgen Starke, Ottobrunn; Peter Nikolaus Keerl, Oberpframmern; Silvio Yasar Ovadya, Taufkirchen; Roland Behr, Neuried, all of Germany

[73] Assignee: Daimler-Benz Aerospace AG, Ottobrunn, Germany

[21] Appl. No.: 804,973

[22] Filed: Feb. 20, 1997

[30] Foreign Application Priority Data

Mar. 16, 1996 [DE] Germany .................. 196 10 370.3

[51] Int. Cl.⁶ .................................................. B64D 1/12
[52] U.S. Cl. ................................. 244/137.3; 244/138 R
[58] Field of Search .............................. 244/138 R, 137.3, 244/147

[56] References Cited

U.S. PATENT DOCUMENTS

| | | | |
|---|---|---|---|
| 2,967,677 | 1/1961 | Winzen et al. | 244/138 R |
| 3,079,113 | 2/1963 | Meyer, Jr. | 244/147 |
| 3,141,640 | 7/1964 | Sutliff et al. | 244/138 R |
| 3,168,266 | 2/1965 | Yost | 244/138 R |
| 3,221,656 | 12/1965 | Sutten | 244/138 R |
| 3,258,230 | 6/1966 | Bollinger | 244/138 R |
| 4,379,534 | 4/1983 | Miller et al. | 244/147 |
| 4,601,443 | 7/1986 | Jones et al. | 244/13 |
| 5,080,305 | 1/1992 | Stencel et al. | 244/138 R |

FOREIGN PATENT DOCUMENTS

| | | |
|---|---|---|
| 25 30 210 A1 | 2/1976 | Germany . |
| 30 02 828 A1 | 7/1981 | Germany . |

*Primary Examiner*—V. Lissi Mojica
*Attorney, Agent, or Firm*—McGlew And Tuttle

[57] ABSTRACT

A landing process and arrangement for payloads from aerospace missions with a steerable gliding body deployable at high altitudes for accurately returning the payload to the earth surface wherein delicate and stressable elements of the payload are to be recovered. The gliding body is filled with a light gas during its deployment, and the aerostatic lift must be lower than the weight of the landing unit. The payload is divided into a body with delicate elements and a body with stressable elements, wherein the body with the stressable elements is suspended on a pulling element at a spaced location under the other body. After the lower body has come into contact with the ground, the upper body is maintained suspended aerostatically.

13 Claims, 1 Drawing Sheet

LANDING PROCESS FOR PAYLOADS FROM AEROSPACE MISSIONS

FIELD OF THE INVENTION

The present invention pertains to a landing process for payloads from aerospace missions, in which a steerable gliding body is deployed at a sufficient altitude within the atmosphere, and the payload, carried by same, is returned accurately to the surface of the earth, wherein the payload comprises physically delicate and physically stressable elements.

BACKGROUND OF THE INVENTION

As is shown in, e.g., U.S. Pat. No. 4,601,443, a great variety of loads can be combined with paraglider-type gliding bodies and can also be provided with drives if needed, i.e., they can be made self-starting. Driveless units are understandably suitable for steered landing maneuvers only. The nonoptimal aerodynamic properties of paragliders, especially the relatively steep gliding angle, may lead to hard landings with high stresses for humans and/or material. The good target precision of such steerable units is admittedly advantageous.

Aerostats, i.e., floats, with an aerodynamic shape, which also obtain a horizontal motion component during ascent and descent as a consequence of an angle of attack, have been known from DE-OS 30 02 828. The movements of such profiled aerostats are more uniform and "softer" than those of paragliders, so that softer landings can also be achieved. However, it should be borne in mind that certain minimum velocities of flight and consequently certain minimum velocities of descent are also necessary in such aerodynamic-aerostatic landing units in order to be still able to land accurately in the case of, e.g., moderate head winds. Consequently, delicate loads may be damaged in the case of this landing process as well, because hard contact with the ground cannot be ruled out.

A free wing in the form of an airfoil for attaching loads has been known from DE-OS 25 30 210. Its flexible shell is filled mostly with a light gas, which stabilizes the shell and imparts aerostatic lift to it. The shell also has inlet openings and chambers for ram air, as a result of which an additional stabilization is said to be achieved during flight. What was stated in the document cited above also applies to this concerning the flight and landing properties.

SUMMARY AND OBJECTS OF THE INVENTION

In light of these prior-art solutions and their drawbacks, the primary object of the present invention is to propose a landing process for payloads from aerospace missions, which makes possible an extremely gentle return of payloads containing physically delicate elements with high target accuracy, acceptable flight time and a high degree of reliability.

According to the invention, a landing process for payloads from aerospace missions is provided, in which a steerable gliding body is deployed at a sufficient altitude within the atmosphere, and the payload, carried by same, is returned accurately to the surface of the earth. The payload comprises physically delicate and physically stressable elements. The gliding body is filled during its deployment at least partly with a gas or gas mixture of a density lower than that of the surrounding atmosphere, and the aerostatic lift is brought to a value that is lower than the weight of the entire landing unit. The payload in the atmosphere is divided into a body containing the delicate elements and a body containing the stressable elements. The body with the stressable elements is suspended on at least one pulling element at a spaced location under the body with the delicate elements. The body with the delicate elements is maintained aerostatically suspended for at least a certain time after the body with the stressable elements has come into contact with the ground.

Consequently, the process according to the present invention uses a deployable, aerodynamically and aerostatically active gliding body, whose lift and the flight properties of the landing unit make possible a low-stress, steered and accurate descent. Furthermore, the payload is divided in space into a body containing the delicate elements and a body containing the stressable elements. The body containing the stressable component is suspended at a spaced location under the body with the delicate component, so that the former will touch down on the ground first during landing. The load relief resulting from this enables the gliding body, which now acts aerostatically only, to keep the body with the delicate elements suspended, so that this body has no contact with the ground, at least initially. It can then be recovered in the suspended state or be let down to the ground, e.g., by releasing the lifting gas from the gliding body. The delicate elements are thus treated as gently as possible despite the initially "normal" landing process with glide and touchdown. Such elements may be, e.g., experimental setups for experiments in weightlessness, various types of measuring instruments, samples, e.g., cloud water samples, living organisms, including humans, etc.

The aerostatic gas filling of the gliding body is preferably generated by heating a gas or gas mixture and/or by evaporating a cryogenic liquid, preferably liquid helium. A part of the frictional heat generated during reentry, which is stored in a suitable manner, is used for the heating and/or evaporation process.

Preferably one auxiliary parachute initiates the deployment process of the gliding body at a predetermined altitude, after which it is integrated in the same landing unit or is dropped off.

The present invention will be explained in greater detail below on the basis of the drawings.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
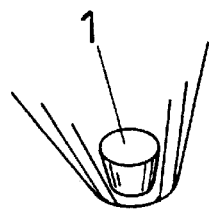
FIG. 1 is a perspective view of the payload at the moment of reentry into the earth atmosphere, according to the invention.

Referring to the drawings in particular, in the example shown, a payload is being returned and recovered from space to the earths atmosphere within the framework of a space mission.

FIG. 1 shows the moment of reentry into the earth atmosphere, wherein the high thermal load of the payload 1 is graphically indicated by "heat rays."

Figure 2:
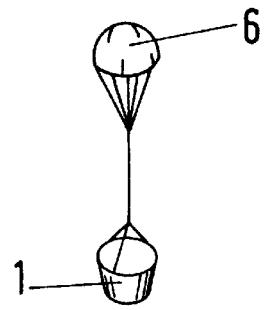
FIG. 2 is a perspective view of the same payload after opening of the auxiliary parachute, according to the invention.

FIG. 2 shows the point in time at which an auxiliary parachute 6, which is used to initiate the deployment of a gliding body 5, has opened.

Figure 3:
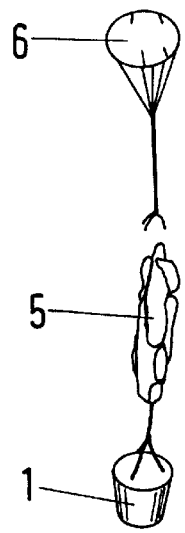
FIG. 3 is a perspective view of the payload at the beginning of the deployment of a gliding body, according to the invention.

FIG. 3 shows the beginning of this deployment process, and it can also be recognized that the auxiliary parachute 6 is dropped off after it had served its purpose. The gliding body 5 is designed in the manner of a paraglider, but some or all of its chambers are not inflated and stabilized, as is usual, with ram air, but are filled with a light gas, as a result of which the gliding body 5 also acquires the properties of an aerostat. The aerostatic lift must be smaller than the weight of the entire landing unit 7 in order to make descent possible. Helium, which is stored in the cryogenic state and is evaporated by supplying heat, is preferably used as the light gas. It is favorable from the viewpoint of energy to use for this purpose heat that is generated as frictional during reentry and is stored in a suitable form. The light gas may also be stored under high pressure, so that its pressure only needs to be released for the deployment process, and it is not necessary to supply heat. Combinations of the two possibilities are also conceivable.

Figure 4:
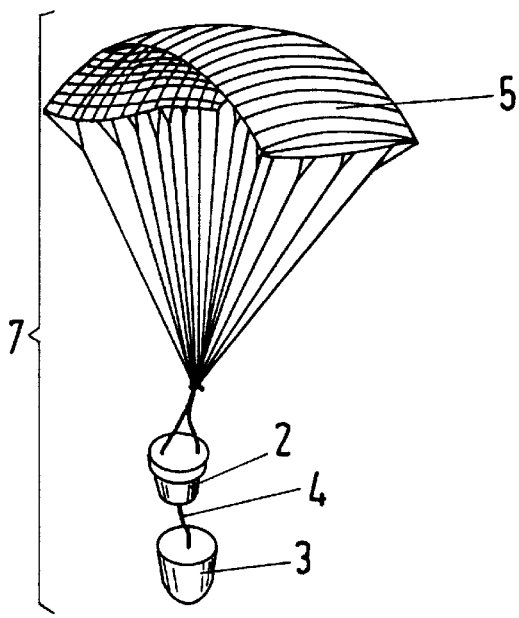
FIG. 4 is a perspective view of a complete landing unit with two-part payload during glide, according to the invention.

FIG. 4 shows the complete landing unit 7 during glide, and steering is performed by changing the angle of attack or profile of the gliding body 5 in partial areas of its span.

The payload 1 is divided separated by separation means into two bodies 2 and 3. The bodies 2 and 3 are connected via a pulling element 4, e.g., in the form of shock-absorbing, spirally braided Kevlar lines after separation. The body 3 containing the physically stressable elements of the payload is arranged at the bottom, i.e., facing the ground, and is designed to come into contact with the ground on landing.

In contrast, the body 2 with the delicate elements of the payload shall not touch the ground at the time of landing and at least for a certain time thereafter, but it shall be kept suspended aerostatically.

Figure 5:
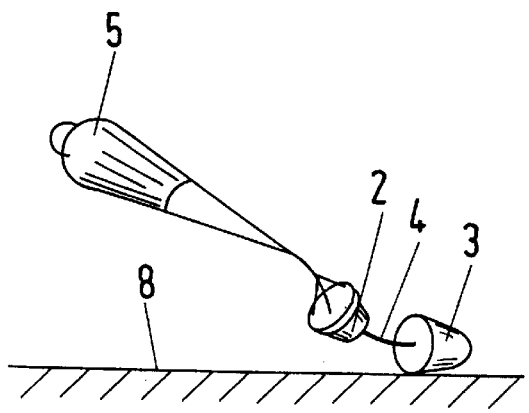
FIG. 5 is a perspective view of the landing unit after contact with the ground according to the invention.

FIG. 5 shows this state after the landing, and the oblique position of the parts maintained in the air is to indicate wind effects. It is favorable during this final phase for the gliding body 5 to offer little air drag, which can be achieved by a limited, preferably automatic folding or bundling up. Its aerostatic lift shall still be so high, at least for a limited time, that the body 2 is reliably suspended. The needed residual lift volume of the bundled-up shell of the former gliding body 5 shall be determined according to this criterion.

The body 2 with the delicate contents can be recovered in the suspended state or after carefully lowering it to the ground, preferably by slowly releasing the residual lifting gas from the shell.

FIGS. 2 through 5 apply analogously to payloads to be returned from flight missions, which do not leave the earth atmosphere. No "heat of reentry" is, of course, available in this case for evaporating liquefied lifting gas.

While a specific embodiment of the invention has been shown and described in detail to illustrate the application of the principles of the invention, it will be understood that the invention may be embodied otherwise without departing from such principles.

What is claimed is:

1. A landing process for payloads from aerospace mission, the process comprising the steps of:
   providing a payload including physically delicate and physically stressable elements;
   deploying a steerable gliding body at a sufficient altitude within the atmosphere, said payload being carried by said steerable gliding body, said payload and said gliding body comprising a landing unit;
   filling the gliding body during said step of deploying at least partly with a gas or gas mixture of a density lower than that of the surrounding atmosphere to establish an aerostatic lift of said filled gliding body at a value that is lower than a weight of said landing unit;
   dividing said payload in the atmosphere into a body containing the delicate elements and a body containing the stressable elements;
   suspending the body with the stressable elements on at least one pulling element at a spaced location under said body with the delicate elements; and
   returning the payload, carried by said steerable gliding body accurately to the surface of the earth including bringing said body with the stressable elements into contact with the ground and maintaining said body with the delicate elements aerostatically suspended for at least a certain time after said body with the stressable elements has come into contact with the ground.

2. A landing process in accordance with claim 1, wherein said gas filling of said gliding body is generated by heating a gas or gas mixture and/or by evaporating a cryogenic liquid.

3. A landing arrangement for payloads in accordance with claim 2, wherein said cryogenic liquid is liquid helium.

4. A landing process in accordance with claim 2 for payloads from space missions with reentry into earth atmosphere, wherein a part of the frictional heat generated during reentry, which is stored in a suitable manner, is used for the heating and/or evaporation process.

5. A landing process in accordance with claim 1, wherein at least one auxiliary parachute initiates the deployment process of the said gliding body at a predetermined altitude, after which it is integrated in the same landing unit or is dropped off.

6. A landing arrangement for payloads from aerospace mission, comprising:
   a payload comprising physically delicate and physically stressable elements;
   separation means for separating said payload in the atmosphere into a body containing the delicate elements and a body containing the stressable elements;
   at least one pulling element, said body with the stressable elements being suspended on said at least one pulling element at a spaced location under said body with the delicate elements;
   a steerable gliding body connected to said payload, said gliding body being deployable at a sufficient altitude within the atmosphere for returning said payload, carried by said steerable gliding body accurately to the surface of the earth, said payload and said gliding body comprising a landing unit, said gliding body including chambers filled at least partly with a gas or gas mixture of a density lower than that of the surrounding atmosphere; and a source of said gas or gas mixture for bringing an aerostatic lift of said filled gliding body to a value that is lower than a weight of said landing unit but higher than a weight of said body containing the delicate elements, whereby said body with the delicate elements is maintained aerostatically suspended for at least a certain time after said body with the stressable elements has come into contact with the ground.

7. A landing arrangement for payloads in accordance with claim 6, wherein said source of said gas or gas mixture includes means for heating a gas or gas mixture and/or evaporating a cryogenic liquid.

8. A landing arrangement for payloads in accordance with claim 7, wherein said cryogenic liquid is liquid helium.

9. A landing arrangement for payloads in accordance with claim 7, wherein said payloads are from space missions which include means for protection upon reentry into earths atmosphere, and include means for storing frictional heat generated during reentry for use by said heating means for heating and/or evaporation.

10. A landing arrangement for payloads in accordance with claim 6, further comprising an auxiliary parachute for initiating a deployment process of said gliding body at a predetermined altitude.

11. A landing process in accordance with claim 1, wherein said value of said aerostatic lift of said filled gliding body is lower than a weight of said landing unit but higher than a weight of said body containing the delicate elements, whereby said body containing the delicate elements is maintained aerostatically suspended for at least a certain time after said body with the stressable elements has come into contact with the ground.

12. A landing process for payloads from aerospace mission, the process comprising the steps of:

providing a payload including physically delicate and physically stressable elements;

deploying a steerable gliding body including paraglider lift surfaces and control surfaces, said step of deploying being at a sufficient altitude within the atmosphere, said payload being carried by said steerable gliding body, said payload and said gliding body comprising a landing unit;

providing a separation of said payload into a body containing the delicate elements and a body containing the stressable elements;

filling the gliding body, during said step of deploying, at least partly with a gas or gas mixture of a density lower than that of the surrounding atmosphere to establish an aerostatic lift of said filled gliding body at a value that is lower than a weight of said landing unit but higher than a weight of said delicate elements;

suspending the body with the stressable elements on at least one pulling element at a spaced location under said body with the delicate elements; and returning the payload, carried by said steerable gliding body accurately to the surface of the earth including bringing said body with the stressable elements into contact with the ground and maintaining said body with the delicate elements aerostatically suspended for at least a certain time after said body with the stressable elements has come into contact with the ground.

13. A landing arrangement for payloads in accordance with claim 6, wherein said steerable gliding body includes paraglider surfaces including control surfaces.

* * * * *